United States Patent
Ahmed et al.

(10) Patent No.: US 11,807,268 B2
(45) Date of Patent: Nov. 7, 2023

(54) SELECTING TRAJECTORIES FOR CONTROLLING AUTONOMOUS VEHICLES

(71) Applicant: GM GLOBAL TECHNOLOGY OPERATIONS LLC, Detroit, MI (US)

(72) Inventors: Sami Ahmed, Orion Township, MI (US); Kevin A. O'Dea, Ann Arbor, MI (US); Audrey D. Porter, Hazel Park, MI (US); Bakhtiar B. Litkouhi, Washington, MI (US); Nikolai K. Moshchuk, Grosse Pointe, MI (US); Kausalya Singuru, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 129 days.

(21) Appl. No.: 17/149,461

(22) Filed: Jan. 14, 2021

(65) Prior Publication Data
US 2022/0219728 A1     Jul. 14, 2022

(51) Int. Cl.
*B60W 60/00* (2020.01)
*B60W 40/072* (2012.01)

(52) U.S. Cl.
CPC ...... *B60W 60/0011* (2020.02); *B60W 40/072* (2013.01); *B60W 60/0053* (2020.02); *B60W 2520/105* (2013.01); *B60W 2520/125* (2013.01)

(58) Field of Classification Search
CPC ......... B60W 60/0011; B60W 60/0053; B60W 40/072; B60W 2520/105; B60W 2520/125
See application file for complete search history.

(56) References Cited

U.S. PATENT DOCUMENTS

| | | | | |
|---|---|---|---|---|
| 2015/0266475 | A1* | 9/2015 | Tanzmeister | B60W 30/0956 701/300 |
| 2018/0150081 | A1* | 5/2018 | Gross | G05D 1/0217 |
| 2018/0348767 | A1* | 12/2018 | Jafari Tafti | G08G 1/202 |
| 2019/0113920 | A1* | 4/2019 | England | G05D 1/027 |
| 2019/0377352 | A1* | 12/2019 | Weißwange | B60W 60/0011 |
| 2020/0010197 | A1 | 1/2020 | Otovic | |
| 2020/0139959 | A1* | 5/2020 | Akella | G05D 1/0088 |
| 2020/0189573 | A1* | 6/2020 | King | B60W 30/0956 |
| 2021/0197822 | A1* | 7/2021 | Jhang | B60W 30/0953 |
| 2022/0314984 | A1* | 10/2022 | Takahashi | B60W 30/12 |

* cited by examiner

*Primary Examiner* — Jeff A Burke
*Assistant Examiner* — Mohamad O El Sayah
(74) *Attorney, Agent, or Firm* — Lorenz & Kopf LLP

(57) ABSTRACT

Systems and methods for controlling an autonomous vehicle are described. A trajectory planner module provides a first trajectory to a trajectory control module. The trajectory control module determines parameters of the first trajectory. The trajectory control module compares the parameters to a respective threshold value. The trajectory control module obtains one or more alternative trajectories, determines parameters of each alternative trajectory, and compares the parameters of the alternative trajectory to a respective threshold value. The trajectory control module selects a trajectory for controlling the autonomous vehicle that has parameters which are within a range defined by the threshold values and controls the autonomous vehicle based on the selected trajectory. Thus, before handing back control to a driver, the trajectory control module selects from alternate trajectories for controlling the autonomous vehicle.

20 Claims, 8 Drawing Sheets

SELECTING TRAJECTORIES FOR CONTROLLING AUTONOMOUS VEHICLES

TECHNICAL FIELD

The technical field generally relates to control of autonomous vehicles. Particularly, the description relates to systems and methods for controlling an autonomous vehicle by selecting a movement trajectory from a plurality of trajectories.

Autonomous vehicles are typically designed to follow a predetermined movement trajectory. The movement trajectory may be generally referred to as a trajectory. When following the trajectory, the autonomous vehicle relies on input data like, inter alia, sensor input relating to the vehicle's environment, the vehicle's current position, and the route destination. The autonomous vehicle dynamically determines a trajectory for the vehicle to follow based on the input data. However, under certain external conditions, i.e., resulting from the vehicle's environment, the autonomous vehicle may not be able to determine a trajectory to follow and control of the vehicle is handed back to a human driver of the vehicle or the vehicle is stopped, i.e., brought to a so-called safe state. Other conditions may result in trajectories that control and move the vehicle in an unpleasant or inconvenient manner.

Accordingly, it is desirable to provide systems and methods for controlling an autonomous vehicle that reduce the amount of handing back control of the vehicle to a human driver. In addition, it is desirable to provide systems and methods that enable controlling an autonomous vehicle in a manner that is pleasant and convenient to human occupants.

Furthermore, other desirable features and characteristics of the present invention will become apparent from the subsequent detailed description and the appended claims, taken in conjunction with the accompanying drawings and the foregoing technical field and background.

SUMMARY

A method for controlling an autonomous vehicle is provided. In one embodiment, the method includes providing, by a trajectory planner module, a first trajectory to a trajectory control module of the autonomous vehicle; determining, by the trajectory control module, parameters of the first trajectory, wherein the parameters include at least one of a curvature of the first trajectory, a lateral jerk of the first trajectory, and a longitudinal jerk of the first trajectory; comparing, by the trajectory control module, at least one parameter of the first trajectory to a respective threshold value, e.g., to a specific threshold value for each parameter; obtaining, by the trajectory control module, at least one alternative trajectory; determining, by the trajectory control module, parameters of each of the at least one alternative trajectory; comparing, by the trajectory control module, at least one parameter of the alternative trajectory to a respective threshold value; in response to at least one parameter of the first trajectory exceeding the respective threshold value, indicating, by the trajectory control module, the first trajectory as invalid, otherwise selecting, by the trajectory control module, the first trajectory for controlling the autonomous vehicle; in response to the first trajectory being invalid, selecting, by the trajectory control module, one of the alternative trajectories that meets all threshold values for controlling the autonomous vehicle; controlling, by the trajectory control module, the autonomous vehicle to follow the selected trajectory.

In an embodiment, the method further includes determining, by the trajectory control module, for each valid trajectory, a convenience value, wherein the convenience value is a sum of a difference between a value of each parameter and the respective threshold value; selecting, by the trajectory control module, that trajectory for controlling the autonomous vehicle with the highest convenience value.

In another embodiment, the method further includes, in response to two or more trajectories having a similar or equal convenience value, selecting, by the trajectory control module, one of the trajectories with the similar or equal convenience value in accordance with a preferential order.

In another embodiment, the obtaining, by the trajectory control module, at least one alternative trajectory, includes obtaining, by the trajectory control module, a first alternative trajectory from a sensor of the autonomous vehicle.

In another embodiment, the step of obtaining, by the trajectory control module, at least one alternative trajectory, includes obtaining, by the trajectory control module, boundary information of a drivable area from a sensor of the autonomous vehicle; and determining, by the trajectory control module, a second trajectory based on the boundary information of the drivable area.

In another embodiment, the method further includes transforming, by the trajectory control module, each trajectory to contain waypoints with coordinates; and using the coordinates to determine the parameters of the trajectory.

In another embodiment, the method further includes escalating, by the trajectory control module, control of the autonomous vehicle to a driver of the autonomous vehicle in response to none of the trajectories meeting the respective threshold values.

In another embodiment, the method further includes sending, by the trajectory control module, a feedback to the trajectory planner module, in response to at least one parameter of the first trajectory exceeding the respective threshold value.

In another embodiment, the method further includes updating, by the trajectory planner module, the first trajectory and providing the updated first trajectory to the trajectory control module.

In another embodiment, the method further includes comparing, by the trajectory control module, at least one parameter of the updated first trajectory to a respective threshold value; in response to at least one parameter of the updated first trajectory exceeding the respective threshold value, indicating, by the trajectory control module, the first trajectory as invalid, otherwise selecting, by the trajectory control module, the updated first trajectory for controlling the autonomous vehicle; in response to the updated first trajectory being invalid, obtaining, by the trajectory control module, at least one alternative trajectory; determining, by the trajectory control module, parameters of each of the at least one alternative trajectory; comparing, by the trajectory control module, at least one parameter of the alternative trajectory to a respective threshold value; selecting, by the trajectory control module, one of the alternative trajectories that meets all threshold values for controlling the autonomous vehicle.

An autonomous vehicle includes a controller with a trajectory planner module and a trajectory control module. The trajectory planner module provides a first trajectory to the trajectory control module. The trajectory control module determines parameters of the first trajectory, wherein the parameters include at least one of a curvature of the first trajectory, a lateral jerk of the first trajectory, and a longitudinal jerk of the first trajectory. The trajectory control module compares at least one parameter of the first trajectory to a respective threshold value, e.g., to a specific threshold value for each parameter. The trajectory control module obtains at least one alternative trajectory. The trajectory control module determines parameters of each of the at least one alternative trajectory. The trajectory control module compares at least one parameter of the alternative trajectory to a respective threshold value. The trajectory control module indicates the first trajectory as invalid in response to at least one parameter of the first trajectory exceeding the respective threshold value, otherwise the trajectory control module selects the first trajectory for controlling the autonomous vehicle. The trajectory control module selects one of the alternative trajectories that meets all threshold values for controlling the autonomous vehicle in response to the first trajectory being invalid. The trajectory control module controls the autonomous vehicle to follow the selected trajectory.

In an embodiment, the trajectory control module determines a convenience value for each valid trajectory, and the convenience value is a sum of a difference between a value of each parameter and the respective threshold value. The trajectory control module selects that trajectory for controlling the autonomous vehicle with the highest convenience value.

In another embodiment, the trajectory control module selects one of the trajectories with the similar or equal convenience value in accordance with a preferential order in response to two or more trajectories having a similar or equal convenience value.

In another embodiment, the autonomous vehicle includes a sensor that detects an environment of the autonomous vehicle and provides a first alternative trajectory to the trajectory control module based on the detected environment.

In another embodiment, the sensor determines boundary information of a drivable area and provides the boundary information to the trajectory control module. The trajectory control module determines a second trajectory based on the boundary information of the drivable area.

In another embodiment, the trajectory control module transforms each trajectory to contain waypoints with coordinates. The trajectory control module uses the coordinates to determine the parameters of the trajectory.

In another embodiment, the trajectory control module escalates control of the autonomous vehicle to a driver of the autonomous vehicle in response to none of the trajectories meeting the respective threshold values.

In another embodiment, the trajectory control module sends a feedback to the trajectory planner module in response to at least one parameter of the first trajectory exceeding the respective threshold value.

In another embodiment, the trajectory planner module updates the first trajectory and provides the updated first trajectory to the trajectory control module.

In another embodiment, the trajectory control module compares at least one parameter of the updated first trajectory to a respective threshold value. The trajectory control module indicates the first trajectory as invalid in response to at least one parameter of the updated first trajectory exceeding the respective threshold value, otherwise it selects the updated first trajectory for controlling the autonomous vehicle. The trajectory control module obtains at least one alternative trajectory in response to the updated first trajectory being invalid, determines parameters of each of the at least one alternative trajectory, compares at least one parameter of the alternative trajectory to a respective threshold value, and selects one of the alternative trajectories that meets all threshold values for controlling the autonomous vehicle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
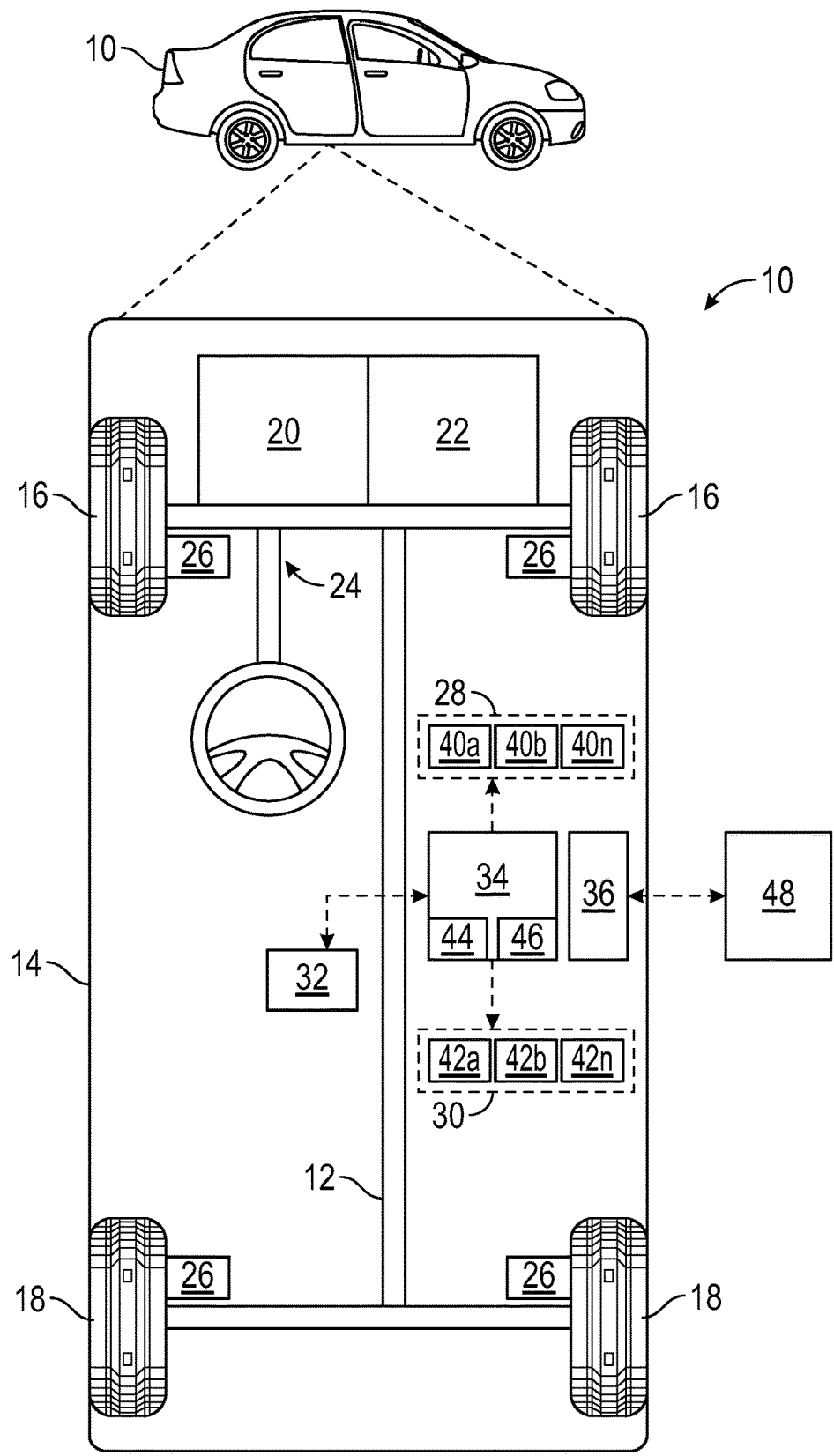
FIG. 1 is a schematic illustration of an autonomous vehicle.

With reference to FIG. 1, a vehicle 10 is shown in accordance with various embodiments. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle. The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is an automation system of Level Two or higher. A Level Two automation system indicates "partial automation". However, in other embodiments, the autonomous vehicle 10 may be a so-called Level Three, Level Four or Level Five automation system. A Level Three automation system indicates conditional automation. A Level Four system indicates "high automation", referring to the driving mode-specific performance by an automated driving system of all aspects of the dynamic driving task, even when a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 an 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
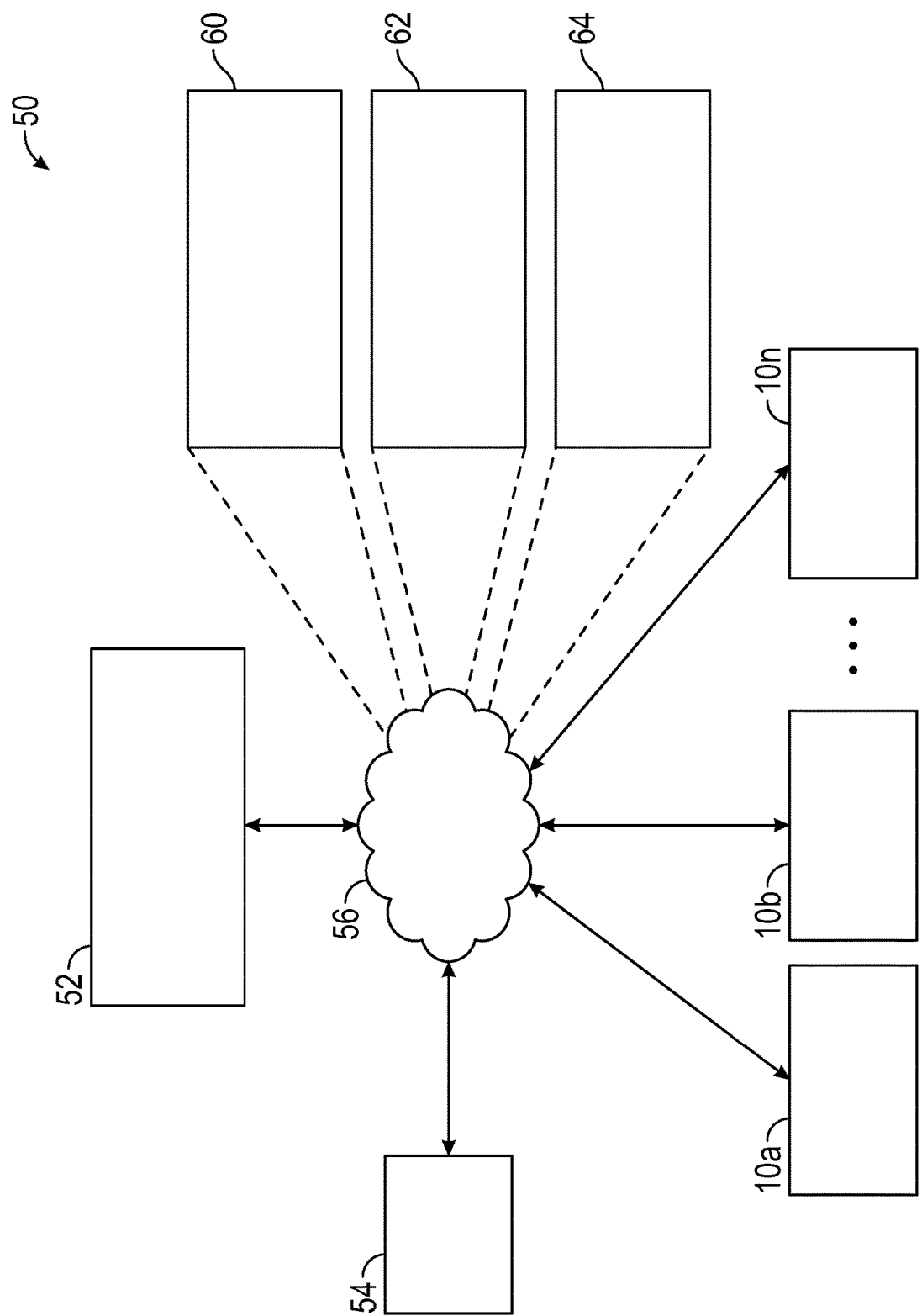
FIG. 2 is a schematic illustration of a communication network interconnecting infrastructure entities and autonomous vehicles.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 34, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

Figure 4:
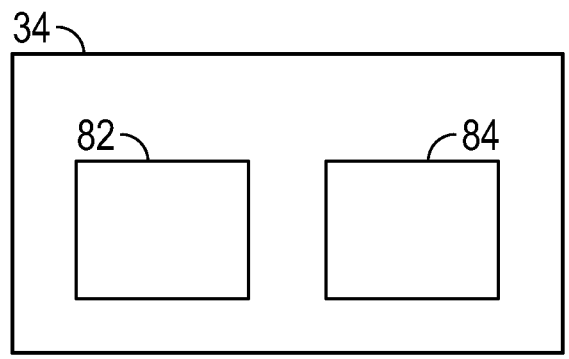
FIG. 4 is a schematic illustration of a controller with a trajectory planner module and a trajectory control module in accordance with an embodiment.

Generally, in accordance with an embodiment, the autonomous vehicle 10 includes a controller 34 with a trajectory planner module 82 (see FIG. 4) and a trajectory control module 84 (see FIG. 4). The trajectory planner module provides a first trajectory to the trajectory control module. The trajectory control module determines parameters of the first trajectory, wherein the parameters include at least one of a curvature of the first trajectory, a lateral jerk of the first trajectory, and a longitudinal jerk of the first trajectory. The trajectory control module compares at least one parameter of the first trajectory to a respective threshold value, e.g., to a specific threshold value for each parameter. The trajectory control module obtains at least one alternative trajectory. The trajectory control module determines parameters of each of the at least one alternative trajectory. The trajectory control module compares at least one parameter of the alternative trajectory to a respective threshold value. The trajectory control module indicates the first trajectory as invalid when at least one parameter of the first trajectory exceeds the respective threshold value, otherwise the trajectory control module selects the first trajectory for controlling the autonomous vehicle. The trajectory control module selects one of the alternative trajectories that meets all threshold values for controlling the autonomous vehicle when the first trajectory is invalid. The trajectory control module controls the autonomous vehicle to follow the selected trajectory.

In one embodiment, the controller 34 implements the trajectory planner module and the trajectory control module as logical functions. Alternatively, the trajectory planner module and the trajectory control module may be implemented on separate and distinct processors, like microcontrollers or the like. The trajectory planner module and the trajectory control module are configured to execute a method for controlling the autonomous vehicle 10. The method includes providing, by the trajectory planner module, a first trajectory to the trajectory control module of the autonomous vehicle 10; determining, by the trajectory control module, parameters of the first trajectory, wherein the parameters include at least one of a curvature of the first trajectory, a lateral jerk of the first trajectory, and a longitudinal jerk of the first trajectory; comparing, by the trajectory control module, at least one parameter of the first trajectory to a respective threshold value, e.g., to a specific threshold value for each parameter; obtaining, by the trajectory control module, at least one alternative trajectory; determining, by the trajectory control module, parameters of each of the at least one alternative trajectory; comparing, by the trajectory control module, at least one parameter of the alternative trajectory to a respective threshold value; when at least one parameter of the first trajectory exceeds the respective threshold value, indicating, by the trajectory control module, the first trajectory as invalid, otherwise selecting, by the trajectory control module, the first trajectory for controlling the autonomous vehicle; when the first trajectory is invalid, selecting, by the trajectory control module, one of the alternative trajectories that meets all threshold values for controlling the autonomous vehicle; controlling, by the trajectory control module, the autonomous vehicle to follow the selected trajectory.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10*a*-10*n* as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10*a*-10*n*. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
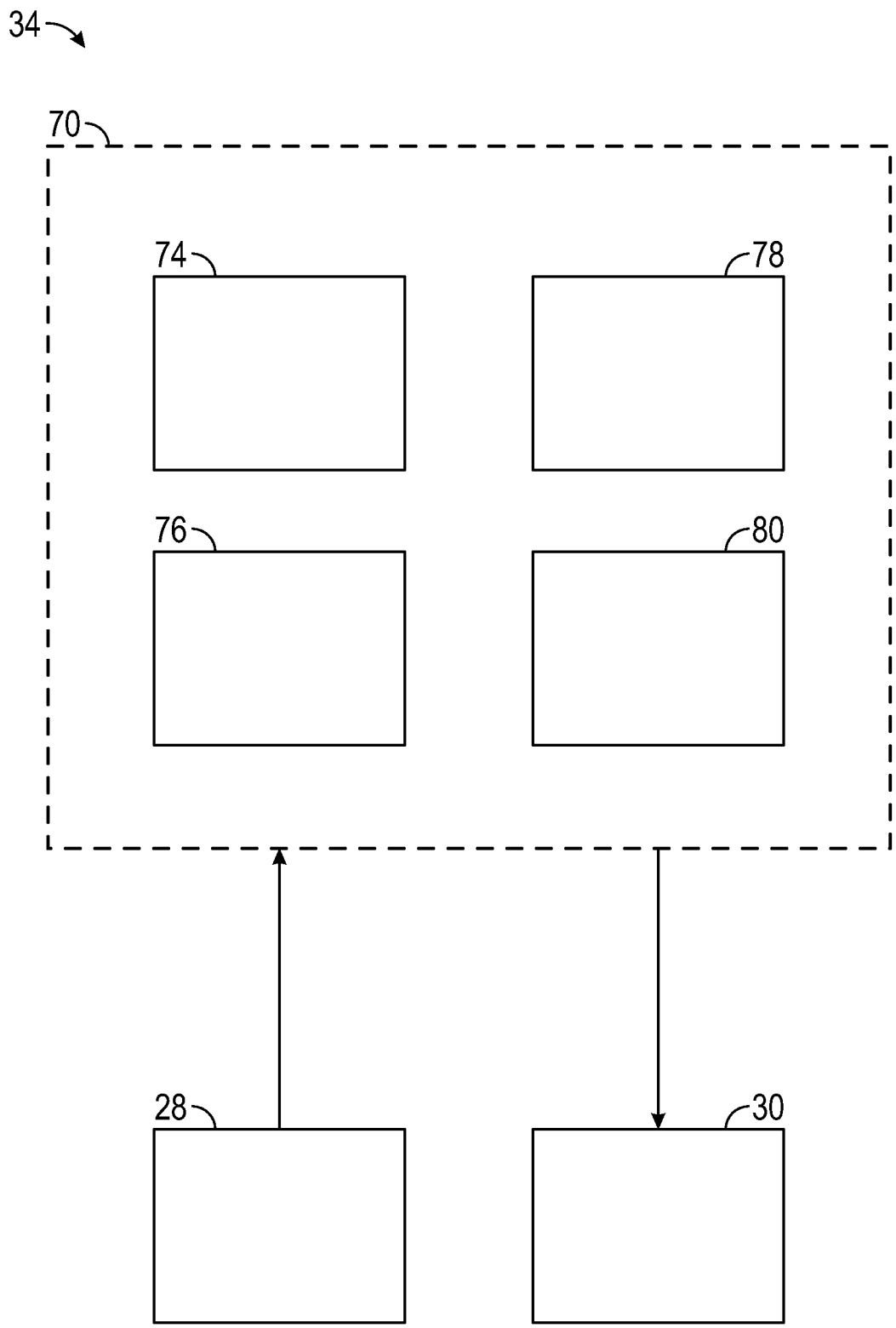
FIG. 3 is a schematic illustration of an autonomous driving system implemented by a controller of an autonomous vehicle.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. The computer vision system 74 may also be referred to as a sensor fusion system, as it fuses input from several sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

The vehicle control system 80 is configured to communicate a vehicle control output to the actuator system 30. In an exemplary embodiment, the actuators 42 include a steering control, a shifter control, a throttle control, and a brake control. The steering control may, for example, control a steering system 24 as illustrated in FIG. 1. The shifter control may, for example, control a transmission system 22 as illustrated in FIG. 1. The throttle control may, for example, control a propulsion system 20 as illustrated in FIG. 1. The brake control may, for example, control wheel brake system 26 as illustrated in FIG. 1.

FIG. 4 exemplarily shows the controller 34 with the trajectory planner module 82 and the trajectory control module 84. It will be appreciated that the modules 82 and 84 may be implemented by the controller 34 in addition to the other functional blocks described with reference to FIG. 1 and FIG. 3. The controller 34 and the modules 82 and 84 execute programmable instructions to implement the method steps described herein with reference to one or more embodiments.

Generally, the trajectory planner module 82 determines a trajectory that is used as a planned moving path or track of the autonomous vehicle 10. This moving path is provided by the trajectory planner module 82 to the trajectory control module 84 and the trajectory control module 84 controls the actuator system 30 and/or the individual actuator devices 42a to 42n of the autonomous vehicle 10 to follow that path.

However, the trajectory provided by the trajectory planner module 82 may under certain conditions provide a trajectory that is less convenient to a passenger of the autonomous vehicle 10 than an alternative trajectory. The approach described herein enables the trajectory control module 84 to compare several available trajectories and select that one that meets certain criteria (parameters of the trajectory) to be convenient or most convenient to a passenger of the autonomous vehicle 10.

The trajectory control module 84 compares parameters of the trajectories to threshold values to determine which trajectory is more or most convenient. The threshold values may be predetermined values for the autonomous vehicle 10 and for each of the parameters, i.e., one threshold value for the curvature, another threshold value for the longitudinal jerk, and another threshold value for the lateral jerk. Additional parameters may be considered. When at least one of the parameters of the first trajectory exceeds the respective one of these threshold values, the first trajectory is deemed invalid because the first trajectory is deemed inconvenient for a passenger of the autonomous vehicle 10. For such case, the trajectory control module 84 is configured to assess whether alternative trajectories meet the predetermined parameters and select an alternative trajectory that meets the parameters, i.e., does not exceed the respective threshold values. The autonomous vehicle 10 is then controlled based on the selected alternative trajectory. The trajectory control module 84 compares the curvature of a trajectory to a curvature threshold, the lateral jerk (derivative of a lateral acceleration) to a lateral jerk threshold, and the longitudinal jerk (derivative of a longitudinal acceleration) to a longitudinal jerk threshold. When one of these parameters exceeds the respective threshold, the respective trajectory is deemed invalid. Otherwise, the trajectory is deemed valid.

In one embodiment, the trajectory control module 84 selects the trajectory with the highest convenience value for controlling the autonomous vehicle 10. When multiple trajectories are valid, the trajectory control module 84 selects that trajectory whose actual parameter are most convenient, i.e., the sum of the difference between threshold value and parameter value is the highest value of all valid trajectories. Generally, when the actual parameters of a trajectory are most distant from the threshold values, that trajectory is deemed most convenient, because that trajectory has the minimum curvature, minimum lateral jerk, and minimum longitudinal jerk. In another embodiment, when multiple trajectories are equal in regards of convenience to the passenger of the autonomous vehicle 10, the trajectory control module 84 selects one of these based on a predetermined preferential order.

Figure 5:
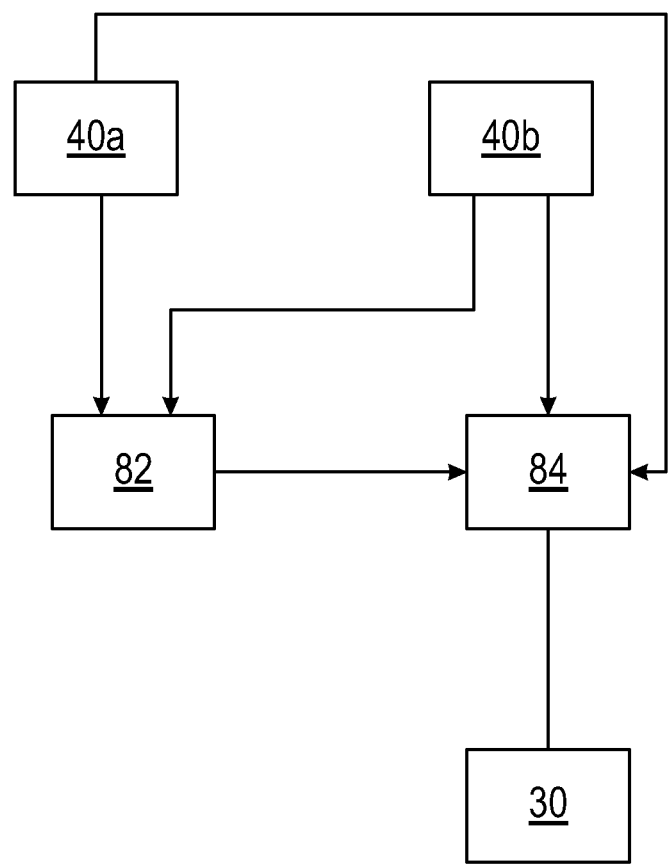
FIG. 5 is a schematic illustration of the data flow between sensing devices, trajectory planner module, trajectory control module, and actuators of an autonomous vehicle in accordance with an embodiment.

FIG. 5 shows an exemplary dataflow between the sensing devices 40a, 40b, the trajectory planner module 82, the trajectory control module 84, and the actuator system 30. The sensing device 40a may be a sensor that detects the environment of the autonomous vehicle 10 including objects and drivable areas, e.g., one of a camera, a Radar, or a Lidar. The sensing device 40b may be a sensor that detects one or more states of the autonomous vehicle 10, e.g., values indicating an acceleration in x-, y-, and z-direction; roll, pitch, and yaw movements; wheel speeds of some or all wheels of the vehicle; a steering wheel angle; a steering wheel rate.

The sensing device 40a provides the sensed data (e.g., objects and drivable area, lane markings offsets, headings, curvature, road geometry) to the trajectory planner module 82 as well as a trajectory to the trajectory control module 84. When the sensing device 40a is a camera, it particularly provides the vehicle position with respect to the lane in the vehicle reference frame. The sensing device 40b provides information about the state of the autonomous vehicle 10 to the trajectory planner module 82 and to the trajectory control module 84. The trajectory planner module 82 implements functions for perceiving, planning, and localizing. Based on the data received from the sensing devices 40a, 40b, the trajectory planner module 82 determines and provides a trajectory to the trajectory control module 84. The trajectory control module 84 may determine another trajectory based on the data received from the sensing devices 40a, 40b and compares all trajectories (the first trajectory received from the trajectory planner module 82, the second trajectory received from the sensing device 40a, and the third trajectory determined by the trajectory control module 84) to threshold values. A trajectory could be polynomial, a trapezoidal acceleration profile, or B-splines. The trajectory control module selects a trajectory that meets the criteria and controls the actuator system 30 to follow the selected trajectory.

In one embodiment, the trajectory control module transforms each trajectory to contain waypoints with coordinates and uses the coordinates to determine the parameters (i.e., curvature, longitudinal jerk, lateral jerk, and possibly others) of the trajectory. Basically, the trajectories can be compared based on position and heading. Each trajectory is transformed by the trajectory control module to contain waypoints with at least two dimensions (x, y). The waypoints and the threshold values are then used to assess the validity of the trajectory, i.e., when the parameters are above or below the predetermined respective threshold values.

In another embodiment, the trajectory control module 84 sends a feedback to the trajectory planner module 82 when the trajectory provided by the trajectory planner module 82 exceeds at least one threshold value. In other words, the trajectory control module 84 informs the trajectory planner module 82 that the first trajectory is not valid (one of the parameters of the first trajectory exceeds the allowed or predetermined threshold value) and cannot be used by the trajectory control module 84 for controlling the autonomous vehicle 10.

Generally, the trajectory control module 84 may assess and select the trajectories in a predetermined order. For example, the trajectory provided by the trajectory planner module 82 is assessed first and selected, when valid. Only when the first trajectory provided by the trajectory planner module is not valid, other trajectories are considered. This approach is based on the underlying assumption that the trajectory provided by the trajectory planner module 82 generally is the best trajectory under normal circumstances. Therefore, it is preferred to control the autonomous vehicle 10 based on the trajectory provided by the trajectory planner module 82. However, when the trajectory provided by the trajectory planner module 82 is not valid, the trajectory control module 84 selects an alternative trajectory (e.g., the trajectory provided by the sensing device 40a or the trajectory determined by the trajectory control module 84) for a short amount of time. For example, when the first trajectory is not valid, the trajectory control module 84 does not use the first trajectory and informs the trajectory planner module 82 that the first trajectory is not valid. The trajectory control module 84 selects an alternative trajectory for controlling the vehicle. The trajectory planner module 82 determines an updated first trajectory and provides it to the trajectory control module 84. Now, the trajectory control module 84 repeats the previous steps and compares the updated first trajectory (and the alternative trajectories) with the threshold values and again selects the best option for controlling the autonomous vehicle 10 in order to meet predetermined convenience criteria for the passengers of the autonomous vehicle 10. Thus, the trajectory control module 84 assesses multiple trajectories in order to be able to select one of these trajectories before handing back control to the driver of the vehicle. This approach reduces the number of handing back control to the human driver of the autonomous vehicle 10.

The trajectory control module 84 may receive more than three trajectories to select from. Therefore, the example with three trajectories outlined above is to be considered non-limiting for the scope. In addition to the trajectories referred to above, the trajectory control module 84 may determine a safe stop trajectory that brings the autonomous vehicle 10 to a stop. The safe stop trajectory may be a fast stop when the human operator or driver is unresponsive or it may be more gradual when the situation is determined to be less urgent.

In one embodiment, all trajectories referred to above are available to the trajectory control module 84 all the time. The normal trajectory used for controlling the autonomous vehicle is the first trajectory provided by the trajectory planner module 82. When the trajectory control module 84 determines that the first trajectory is not valid (i.e., its parameters exceed at least one threshold for curvature, lateral jerk, longitudinal jerk), it assesses the alternative trajectories (second trajectory, third trajectory, etc.) as long as one of the alternative trajectories is deemed valid. The valid trajectory is then used for controlling the autonomous vehicle 10.

Therefore, when the first trajectory provided by the trajectory planner module 82 is not valid, the trajectory control module 84 selects an alternate trajectory and controls the autonomous vehicle 10 based on this alternate trajectory instead of handing back control to the driver of the autonomous vehicle 10. As soon as the trajectory planner module 82 has updated the first trajectory, the trajectory control module 84 assesses the updated first trajectory and uses it when it meets the validity criteria (i.e., the trajectory control module 84 compares the first trajectory to the threshold values). When the first trajectory that is provided by the trajectory planner module 82 is not feasible for a predetermined amount of time (e.g., 10 seconds or more), the driver will be notified by the controller 34 and asked to take control of the vehicle. Thus, the alternate trajectories are used by the trajectory control module 84 only for a limited period of time during which no valid trajectory from the trajectory planner module 82 is available. However, the alternate trajectories enable the trajectory control module 84 to still control the autonomous vehicle 10 without asking the driver to take control.

The approach described herein allows for a control of an autonomous vehicle 10 which can examine and determine whether or not to follow a trajectory provided by a trajectory planner module 82, compensate for it by selecting an alternate trajectory, or escalate to the driver as a last resort when none of the trajectories meets certain predefined criteria. Primarily, the trajectory control module 84 uses an alternate trajectory in order to continue operation and not hand back control to the driver unless and only when any of the trajectories is deemed not valid. When the trajectory planner module 82 sends a trajectory, the trajectory control module 84 first determines the validity of this trajectory and does not strictly follow it. When this trajectory is deemed invalid, the trajectory control module 84 determines the validity of alternate trajectories and selects one for controlling the autonomous vehicle.

Instead of strictly following a trajectory, the trajectory control module 84 runs diagnostics of a trajectory for curvature, lateral and longitudinal jerk and sets flags when one of these estimations exceed a threshold value.

A trajectory is not valid when one or more of the following criteria is met: the actuator system 30 does not have the capability to execute the trajectory; the trajectory results in vehicle instability due to tire force saturation, slippery road condition, etc.; the trajectory adversely affects occupant's experience. The threshold values are set accordingly to define when a trajectory is invalid.

FIGS. 6 to 9 exemplarily show an implementation of a method for controlling an autonomous vehicle 10 in accordance with several embodiments.

Figure 6:
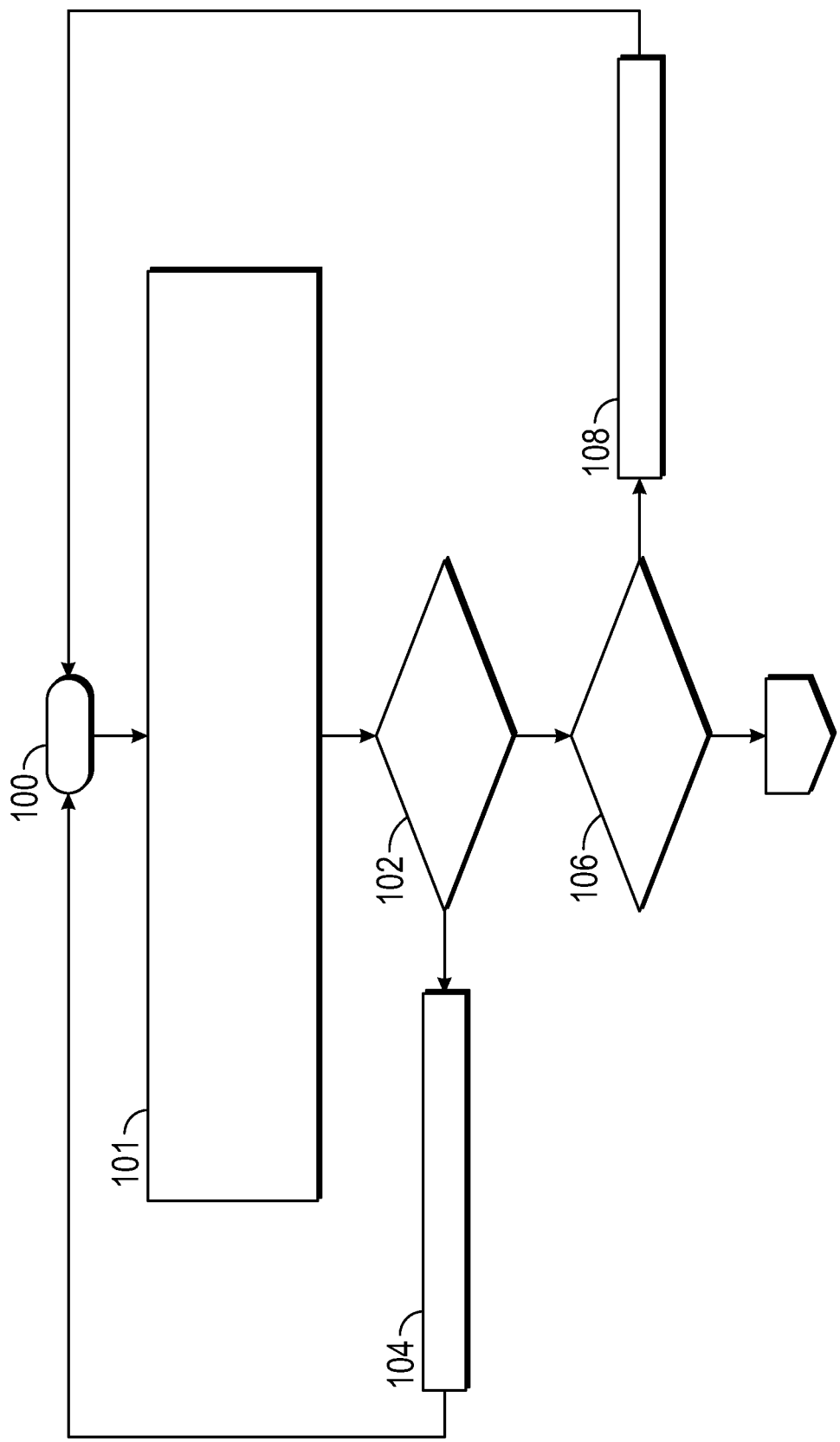
FIG. 6 is a schematic illustration of steps of a method for controlling an autonomous vehicle in accordance with an embodiment.

FIG. 6 shows the start of the method. At 100, the method starts. Then, at 101, the trajectory control module 84 obtains trajectories. The trajectory control module 84 may obtain a trajectory from the trajectory planner module 82, one or more trajectories from a sensing device based on sensed data or received from a secondary source, and/or the trajectory control module 84 generates a safe stop trajectory. At 102, the trajectory control module 84 verifies whether all trajectories are valid. In case not all trajectories are valid, the method continues at 104 and control engage is not allowed. The method proceeds to 100. When all trajectories are valid at 102, it is verified at 106 whether control is engaged. When control is not engaged, control engage is allowed at 108 and the method proceeds to 100. When control is engaged at 106, the method proceeds to FIG. 7. The steps described with reference to FIG. 6 make sure that the method, at this early stage, is started with valid trajectories.

Figure 7:
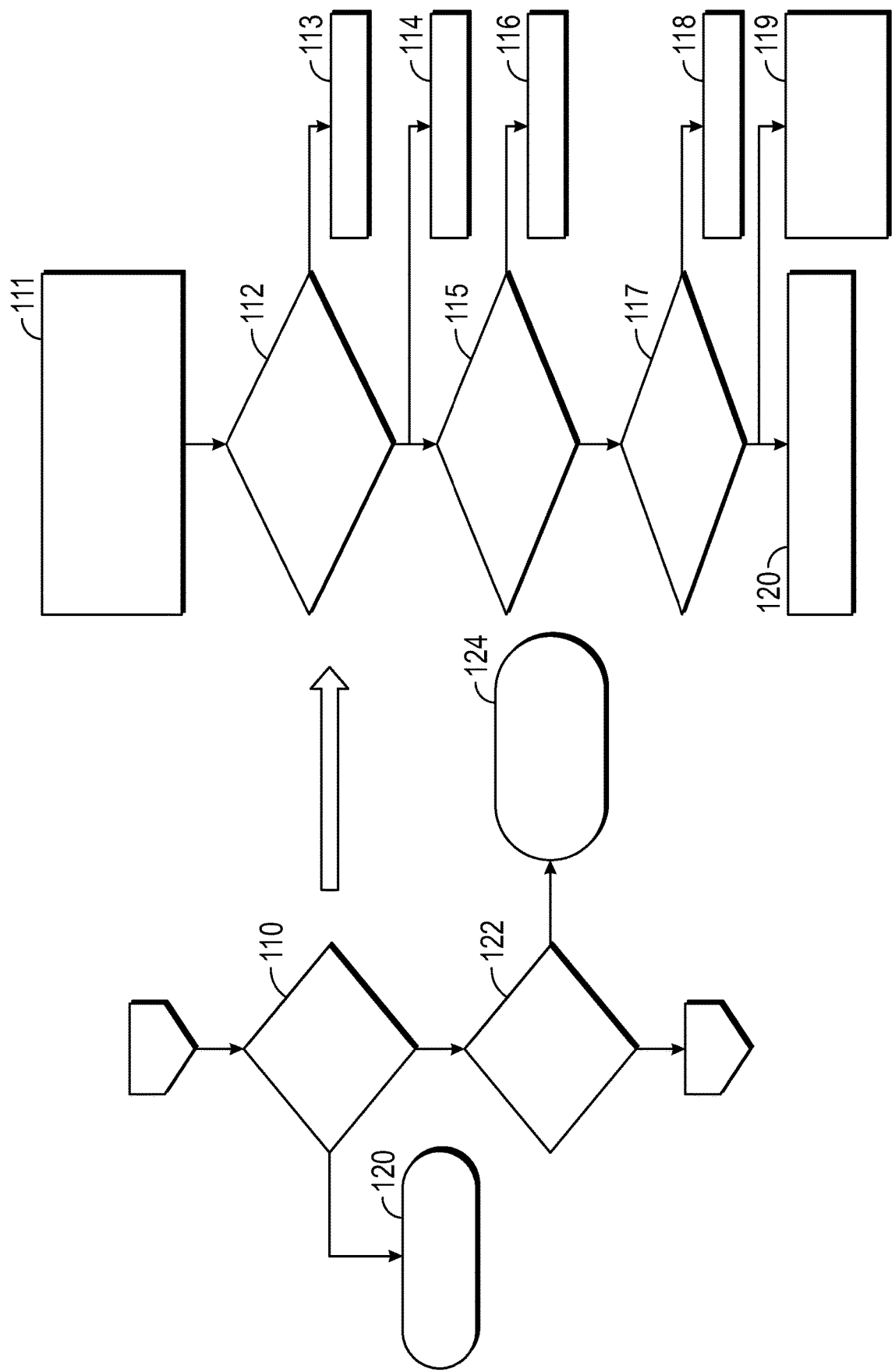
FIG. 7 is a schematic illustration of steps of a method for controlling an autonomous vehicle in accordance with an embodiment.

In FIG. 7, at 110, the method verifies whether a trajectory is valid. Details of this verification are shown on the right side of FIG. 7 and will be described in greater detail below. When a trajectory is valid at 110, the method proceeds to 120 and the trajectory control module 84 instructs the actuator system 30 to follow the valid trajectory, e.g., the first trajectory. When the trajectory is not valid at 110, it is verified at 122 whether the vehicle is stopped. When the vehicle is stopped, the steering wheel angle rate is set to zero and the brakes are commanded into a stop state at 124. Otherwise, when the vehicle is not stopped at 122, the autonomous vehicle 10 is commanded by the trajectory control module 84 to follow an alternate trajectory, e.g., the second trajectory.

Now, with further reference to FIG. 7, details are provided about the verification process at 110 whether a trajectory is valid. At 111, a current and predicted values for driving curvature, lateral acceleration, longitudinal acceleration (and optionally other parameters of a trajectory) are calculated. At 112, it is verified whether the difference between the current driving curvature value and the predicted curvature value is greater than a threshold. When this difference is not greater than the threshold, the respective trajectory is indicated valid at 113. Otherwise, when the difference is greater than the threshold value, a curvature flag is set at 114 and it is verified at 115 whether the longitudinal jerk is greater than a threshold value. When the longitudinal jerk is not greater than the threshold value, the trajectory is indicated valid at 116. Otherwise, when the longitudinal jerk is greater than the threshold value at 115, it is verified at 117 whether the curvature flag is set. When the curvature flag is not set, the jerk flag is set at 118. Otherwise, when the curvature flag is set, trajectory control module 84 sends a feedback to the trajectory planner module 82 at 119 and indicates the trajectory invalid at 120.

It is to be understood that the validity of a trajectory may be verified by additionally considering several other parameters not referred to explicitly in this description. Each parameter is compared to a respective threshold value.

Figure 8:
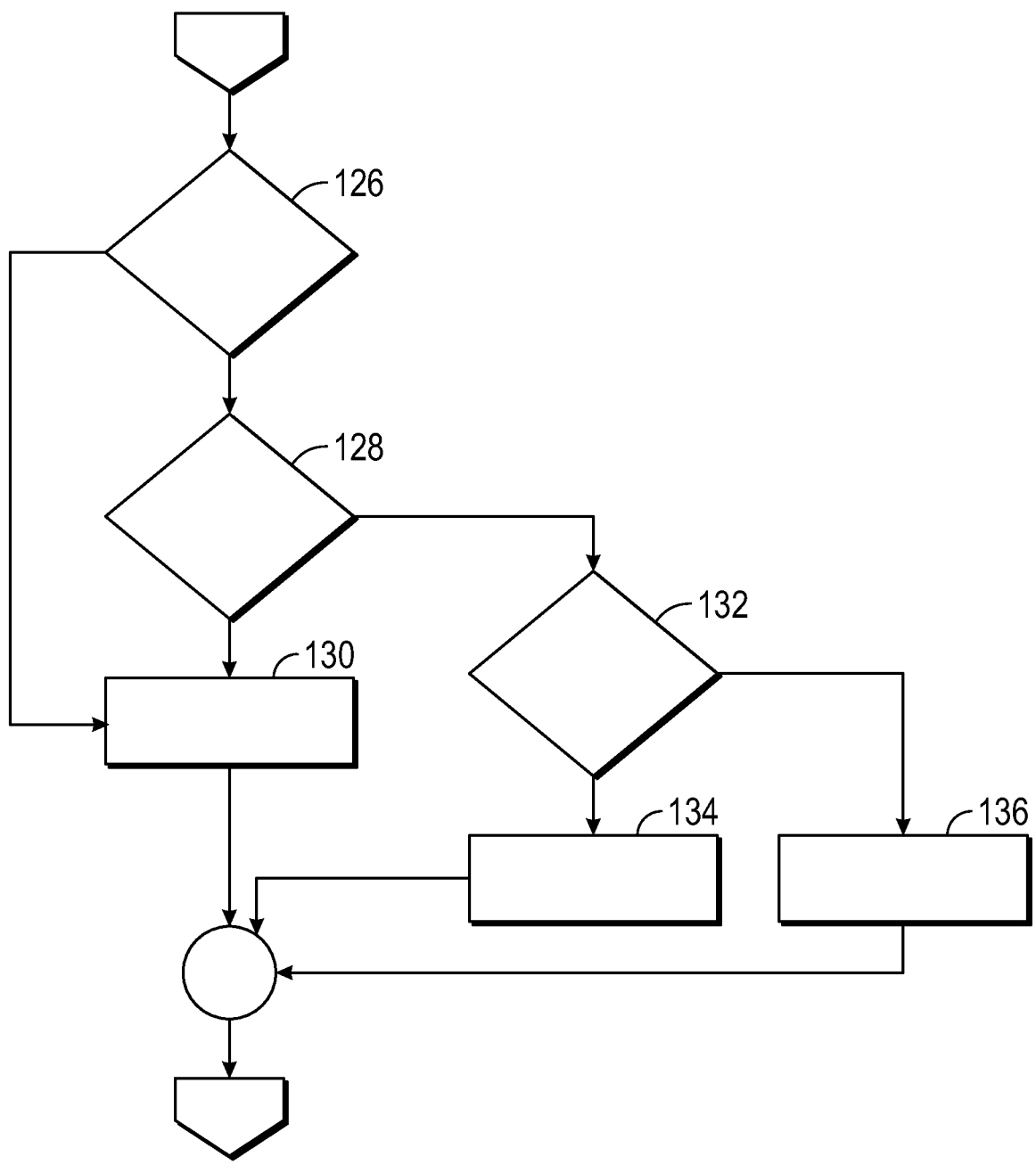
FIG. 8 is a schematic illustration of steps of a method for controlling an autonomous vehicle in accordance with an embodiment.

FIG. 8 illustrates how multiple trajectories are prioritized by the trajectory control module 84. When all trajectories are valid at 126, the trajectory control module 84 uses, at 130, the first trajectory that is typically received from the trajectory planner module 82. When not all trajectories are valid at 126, it is verified at 128 whether the first trajectory is valid. When, at 128, the first trajectory is valid, it is used at 130. Otherwise, it is verified at 132 whether the second trajectory is valid. When the second trajectory is deemed valid at 132, it is used at 134 for controlling the autonomous vehicle 10. Otherwise, when the second trajectory is deemed not valid at 132, the third trajectory is used at 136.

Figure 9:
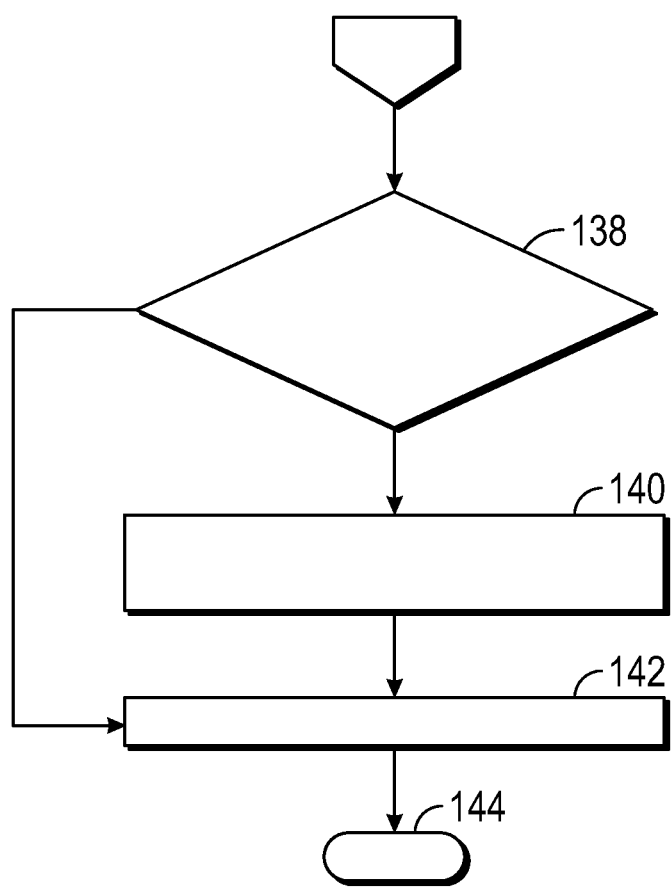
FIG. 9 is a schematic illustration of steps of a method for controlling an autonomous vehicle in accordance with an embodiment.

FIG. 9 shows how the method proceeds after the steps shown in FIG. 7 and FIG. 8. At 138, it is verified whether the selected trajectory is equal to the last trajectory. When this is true, control of the autonomous vehicle 10 is continued at 142. Otherwise, at 140, a path from the current location to a new trajectory is generated by the trajectory control module 84 and control is continued at 142. At 144, the method ends.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling an autonomous vehicle, the method comprising the following steps:
    providing, by a processor of a trajectory planner module, a first trajectory to a trajectory control module of the autonomous vehicle;
    determining, by a processor of the trajectory control module, parameters of the first trajectory, wherein the parameters include a curvature of the first trajectory, a lateral jerk of the first trajectory, and a longitudinal jerk of the first trajectory;
    comparing, by the processor of the trajectory control module, a difference between a predicted curvature of the road and the curvature of the first trajectory to a first threshold valued;
    comparing, by the processor of the trajectory control module, the longitudinal jerk to a second threshold value;
    comparing, by the processor of the trajectory control module, the lateral jerk to a third threshold value;
    obtaining, by the processor of the trajectory control module, at least one alternative trajectory from a source other than the trajectory planner module;
    determining, by the processor of the trajectory control module, parameters of each of the at least one alternative trajectory;
    comparing, by the processor of the trajectory control module, at least one parameter of the alternative trajectory to a respective threshold value;
    in response to at least one parameter of the first trajectory exceeding the respective first, second, and third threshold value, indicating, by the processor of the trajectory control module, the first trajectory as invalid, otherwise selecting, by the trajectory control module, the first trajectory for controlling the autonomous vehicle;
    in response to the first trajectory being invalid, selecting, by the processor of the trajectory control module, one of the alternative trajectories that meets all threshold values for controlling the autonomous vehicle; and
    controlling, by the processor of the trajectory control module, the autonomous vehicle to follow the selected trajectory.

2. The method of claim 1, further comprising:
    determining, by the trajectory control module, for each valid trajectory, a convenience value, wherein the convenience value is a sum of a difference between a value of each parameter and the respective threshold value;
    selecting, by the trajectory control module, that trajectory for controlling the autonomous vehicle with the highest convenience value.

3. The method of claim 2, further comprising:
    in response to two or more trajectories having a convenience value within a range, selecting, by the trajectory control module, one of the two or more trajectories in accordance with a preferential order.

4. The method of claim 1,
    wherein the step of obtaining, by the trajectory control module, at least one alternative trajectory, comprises:
    obtaining, by the trajectory control module, a first alternative trajectory from a sensor of the autonomous vehicle.

5. The method of claim 4,
    wherein the step of obtaining, by the trajectory control module, at least one alternative trajectory, comprises:

obtaining, by the trajectory control module, boundary information of a drivable area from a sensor of the autonomous vehicle; and determining, by the trajectory control module, a second trajectory based on the boundary information of the drivable area.

6. The method of claim 1, further comprising:

transforming, by the trajectory control module, each trajectory to contain waypoints with coordinates; and using the coordinates to determine the parameters of the trajectory.

7. The method of claim 1, further comprising:

in response to none of the trajectories meeting the respective threshold values, escalating, by the trajectory control module, control of the autonomous vehicle to a driver of the autonomous vehicle.

8. The method of claim 1, further comprising:

in response to at least one parameter of the first trajectory exceeding the respective threshold value, sending, by the trajectory control module, a feedback to the trajectory planner module.

9. The method of claim 8, further comprising:

updating, by the trajectory planner module, the first trajectory and providing the updated first trajectory to the trajectory control module.

10. The method of claim 9, further comprising:

comparing, by the trajectory control module, at least one parameter of the updated first trajectory to a respective threshold value;

in response to at least one parameter of the updated first trajectory exceeding the respective threshold value, indicating, by the trajectory control module, the first trajectory as invalid, otherwise selecting, by the trajectory control module, the updated first trajectory for controlling the autonomous vehicle;

in response to the updated first trajectory being invalid, obtaining, by the trajectory control module, at least one alternative trajectory; determining, by the trajectory control module, parameters of each of the at least one alternative trajectory; comparing, by the trajectory control module, at least one parameter of the alternative trajectory to a respective threshold value;

selecting, by the trajectory control module, one of the alternative trajectories that meets all threshold values for controlling the autonomous vehicle.

11. An autonomous vehicle, comprising a controller with a trajectory planner module and a trajectory control module, wherein the trajectory planner module is configured to, by a processor, provide a first trajectory to the trajectory control module;

wherein the trajectory control module is configured to, by the processor, determine parameters of the first trajectory, wherein the parameters include at least one of a curvature of the first trajectory, a lateral jerk of the first trajectory, and a longitudinal jerk of the first trajectory;

wherein the trajectory control module is configured to, by the processor, compare a difference between a predicted curvature of the road and the curvature of the first trajectory to a first threshold value, compare the longitudinal jerk to a second threshold value, and compare the lateral jerk to a third threshold value;

wherein the trajectory control module is configured to, by the processor, obtain at least one alternative trajectory from a source other than the trajectory planner module;

wherein the trajectory control module is configured to, by the processor, determine parameters of each of the at least one alternative trajectory;

wherein the trajectory control module is configured to, by the processor, compare at least one parameter of the alternative trajectory to a respective threshold value;

wherein the trajectory control module is configured to, by the processor, indicate the first trajectory as invalid in response to at least one parameter of the first trajectory exceeding the respective first, second, and third threshold value, otherwise the trajectory control module is configured to select the first trajectory for controlling the autonomous vehicle;

wherein the trajectory control module is configured to, by the processor, select one of the alternative trajectories that meets all threshold values for controlling the autonomous vehicle in response to the first trajectory being invalid; and wherein the trajectory control module is configured to, by the processor, control the autonomous vehicle to follow the selected trajectory.

12. The autonomous vehicle of claim 11, wherein the trajectory control module is configured to determine a convenience value for each valid trajectory, wherein the convenience value is a sum of a difference between a value of each parameter and the respective threshold value;

wherein the trajectory control module is configured to select that trajectory for controlling the autonomous vehicle with the highest convenience value.

13. The autonomous vehicle of claim 12, wherein the trajectory control module is configured to select one of the trajectories with the convenience value being within a range in accordance with a preferential order in response to two or more trajectories having convenience values within the range.

14. The autonomous vehicle of claim 11, comprising a sensor that is configured to detect an environment of the autonomous vehicle and to provide a first alternative trajectory to the trajectory control module based on the detected environment.

15. The autonomous vehicle of claim 14, wherein the sensor is configured to determine boundary information of a drivable area and to provide the boundary information to the trajectory control module; and wherein the trajectory control module is configured to determine a second trajectory based on the boundary information of the drivable area.

16. The autonomous vehicle of claim 11, wherein the trajectory control module is configured to transform each trajectory to contain waypoints with coordinates; and wherein the trajectory control module is configured to use the coordinates to determine the parameters of the trajectory.

17. The autonomous vehicle of claim 11, wherein the trajectory control module is configured to escalate control of the autonomous vehicle to a driver of the autonomous vehicle in response to none of the trajectories meeting the respective threshold values.

18. The autonomous vehicle of claim 11, wherein the trajectory control module is configured to send a feedback to the trajectory planner module in response to at least one parameter of the first trajectory exceeding the respective threshold value.

19. The autonomous vehicle of claim 18, wherein the trajectory planner module is configured to update the first trajectory and provide the updated first trajectory to the trajectory control module.

20. The autonomous vehicle of claim 19,
wherein the trajectory control module is configured to compare at least one parameter of the updated first trajectory to a respective threshold value;
wherein the trajectory control module is configured to indicate the first trajectory as invalid in response to at least one parameter of the updated first trajectory exceeding the respective threshold value, otherwise to select the updated first trajectory for controlling the autonomous vehicle;
wherein the trajectory control module is configured to obtain at least one alternative trajectory in response to the updated first trajectory being invalid, to determine parameters of each of the at least one alternative trajectory, to compare at least one parameter of the alternative trajectory to a respective threshold value, and to select one of the alternative trajectories that meets all threshold values for controlling the autonomous vehicle.

* * * * *